(12) United States Patent
Lee

(10) Patent No.: US 7,720,431 B2
(45) Date of Patent: May 18, 2010

(54) METHOD AND APPARATUS FOR PROVIDING EMERGENCY INFORMATION TO A MOBILE RECEIVING DEVICE

(75) Inventor: Sean S. Lee, Rockville, MD (US)

(73) Assignee: The DIRECTV Group, Inc., El Segundo, CA (US)

(*) Notice: Subject to any disclaimer, the term of this patent is extended or adjusted under 35 U.S.C. 154(b) by 709 days.

(21) Appl. No.: 11/595,393

(22) Filed: Nov. 10, 2006

(65) Prior Publication Data

US 2007/0149167 A1    Jun. 28, 2007

Related U.S. Application Data

(63) Continuation-in-part of application No. 11/443,787, filed on May 31, 2006.

(60) Provisional application No. 60/754,480, filed on Dec. 28, 2005.

(51) Int. Cl.
*H04H 20/71* (2008.01)
*H04M 11/04* (2006.01)
*H04W 24/00* (2009.01)

(52) U.S. Cl. ............... 455/3.01; 455/404.1; 455/404.2; 455/456.1

(58) Field of Classification Search .............. 455/404.1, 455/404.2, 3.01, 3.06, 66.1, 344, 427, 400.1, 455/456.1
See application file for complete search history.

(56) References Cited

U.S. PATENT DOCUMENTS

| | | | |
|---|---|---|---|
| 3,860,746 A | 1/1975 | Takeuchi | |
| 3,993,955 A | 11/1976 | Belcher et al. | |
| 4,155,042 A | 5/1979 | Permut et al. | |
| 4,390,904 A | 6/1983 | Johnston et al. | |
| 5,070,404 A | 12/1991 | Bullock et al. | |
| 5,121,430 A | 6/1992 | Ganzer et al. | |
| 5,260,778 A | 11/1993 | Kauffman et al. | |
| 5,388,101 A | 2/1995 | Dinkins | |

(Continued)

FOREIGN PATENT DOCUMENTS

EP    0831606 A2    3/1998

(Continued)

OTHER PUBLICATIONS

U.S. Appl. No. 09/964,231, filed Sep. 26, 2001, Curtis et al.

(Continued)

*Primary Examiner*—Tilahun Gesesse

(57) ABSTRACT

A mobile wireless system (10) includes a transmitter such as a satellite (18) that broadcasts wireless signals such as boundaries for specific areas to a mobile receiving device (22). Mobile receiving device (22) may include an antenna (26) and a mobile receiving device (28). A locating receiver (50) is used to generate locating signals so that a determination may be made to the location of the mobile receiving device. When the location is outside an area of interest the area of interest may be extended to provide services to the mobile device. Emergency information is broadcast to a first area. An emergency announcement indicator is also broadcast into a first area and an area outside the first area. The location of the mobile receiving device is compared to the first area and the emergency information is displayed when the location is within the first area.

31 Claims, 7 Drawing Sheets

U.S. PATENT DOCUMENTS

| | | | |
|---|---|---|---|
| 5,410,728 | A | 4/1995 | Bertiger et al. |
| 5,432,542 | A | 7/1995 | Thibadeau et al. |
| 5,448,623 | A | 9/1995 | Wiedeman et al. |
| 5,491,717 | A | 2/1996 | Hall |
| 5,512,935 | A | 4/1996 | Majeti et al. |
| 5,565,909 | A | 10/1996 | Thibadeau et al. |
| 5,574,968 | A | 11/1996 | Olds et al. |
| 5,585,858 | A | 12/1996 | Harper et al. |
| 5,625,867 | A | 4/1997 | Rouffet et al. |
| 5,625,868 | A | 4/1997 | Jan et al. |
| 5,636,245 | A | 6/1997 | Ernst et al. |
| 5,659,366 | A | 8/1997 | Kerman |
| 5,664,948 | A | 9/1997 | Dimitriadis et al. |
| 5,701,161 | A | 12/1997 | Williams et al. |
| 5,760,820 | A | 6/1998 | Eda et al. |
| 5,825,407 | A | 10/1998 | Cowe et al. |
| 5,826,188 | A | 10/1998 | Tayloe et al. |
| 5,826,190 | A | 10/1998 | Krutz et al. |
| 5,838,277 | A | 11/1998 | Loomis et al. |
| 5,850,218 | A | 12/1998 | LaJoie et al. |
| 5,920,804 | A | 7/1999 | Armbruster et al. |
| 6,020,913 | A | 2/2000 | Bush et al. |
| 6,029,045 | A | 2/2000 | Picco et al. |
| 6,115,667 | A | 9/2000 | Nakamura |
| 6,205,582 | B1 | 3/2001 | Hoarty |
| 6,240,369 | B1 | 5/2001 | Foust |
| 6,266,816 | B1 | 7/2001 | Watson et al. |
| 6,334,059 | B1 | 12/2001 | Stilp et al. |
| 6,340,997 | B1 | 1/2002 | Borseth |
| 6,424,840 | B1 | 7/2002 | Fitch et al. |
| 6,529,742 | B1 | 3/2003 | Yang |
| 6,543,051 | B1 | 4/2003 | Manson et al. |
| 6,546,246 | B1 | 4/2003 | Bridges et al. |
| 6,552,661 | B1 | 4/2003 | Lastinger et al. |
| 6,553,232 | B1 | 4/2003 | Shaffer et al. |
| 6,571,096 | B2 | 5/2003 | Plunkett |
| 6,698,020 | B1 | 2/2004 | Zigmond et al. |
| 6,748,410 | B1 | 8/2004 | Richard |
| 6,772,433 | B1 | 8/2004 | La Joie et al. |
| 6,782,392 | B1 | 8/2004 | Weinberger et al. |
| 6,785,551 | B1 | 8/2004 | Richard |
| 6,806,830 | B2 | 10/2004 | Panasik et al. |
| 6,952,574 | B2 * | 10/2005 | Tealdi et al. ............ 455/404.2 |
| 6,968,206 | B1 | 11/2005 | Whitsey-Anderson |
| 7,034,695 | B2 | 4/2006 | Troxler |
| 7,107,046 | B1 | 9/2006 | Mainard et al. |
| 7,130,610 | B2 * | 10/2006 | Dolezal et al. ........... 455/404.1 |
| 7,164,986 | B2 | 1/2007 | Humphries et al. |
| 7,251,318 | B1 | 7/2007 | Henderson |
| 2002/0060747 | A1 | 5/2002 | Nonomura |
| 2002/0072361 | A1 | 6/2002 | Knoblach et al. |
| 2002/0100043 | A1 | 7/2002 | Lowthert et al. |
| 2002/0106987 | A1 | 8/2002 | Linden |
| 2002/0124252 | A1 | 9/2002 | Schaefer et al. |
| 2002/0151327 | A1 | 10/2002 | Levitt |
| 2002/0161633 | A1 | 10/2002 | Jacob et al. |
| 2002/0167442 | A1 | 11/2002 | Taylor |
| 2002/0167965 | A1 | 11/2002 | Beasley et al. |
| 2003/0008656 | A1 | 1/2003 | Yamashita et al. |
| 2003/0054809 | A1 | 3/2003 | Bridges et al. |
| 2003/0066078 | A1 | 4/2003 | Bjorgan et al. |
| 2003/0100307 | A1 | 5/2003 | Wolochow et al. |
| 2003/0181160 | A1 | 9/2003 | Hirsch |
| 2003/0188113 | A1 | 10/2003 | Grawrock et al. |
| 2003/0217362 | A1 | 11/2003 | Summers et al. |
| 2003/0221191 | A1 | 11/2003 | Khusheim |
| 2004/0019900 | A1 | 1/2004 | Knightbridge et al. |
| 2004/0128682 | A1 | 7/2004 | Liga et al. |
| 2004/0205829 | A1 | 10/2004 | Hane, III |
| 2004/0244035 | A1 | 12/2004 | Wright et al. |
| 2005/0025089 | A1 | 2/2005 | Walker et al. |
| 2005/0055729 | A1 | 3/2005 | Atad et al. |
| 2005/0104797 | A1 | 5/2005 | McCollum |
| 2005/0143005 | A1 | 6/2005 | Moore |
| 2005/0154531 | A1 | 7/2005 | Kelly et al. |
| 2005/0182932 | A1 | 8/2005 | Wheeler |
| 2005/0186931 | A1 | 8/2005 | Laiho et al. |
| 2005/0200555 | A1 | 9/2005 | McCollum |
| 2005/0203927 | A1 | 9/2005 | Sull et al. |
| 2005/0235310 | A1 | 10/2005 | Bies |
| 2005/0249139 | A1 | 11/2005 | Nesbit |
| 2006/0063559 | A1 | 3/2006 | Fruit et al. |
| 2006/0085310 | A1 | 4/2006 | Mylet et al. |
| 2007/0113243 | A1 | 5/2007 | Brey |
| 2007/0176792 | A1 | 8/2007 | Butzer et al. |

FOREIGN PATENT DOCUMENTS

| | | |
|---|---|---|
| FR | 2789246 | 8/2000 |
| GB | 2344009 | 5/2000 |
| WO | WO 03/094017 | 11/2003 |
| WO | 2006072825 A1 | 7/2006 |

OTHER PUBLICATIONS

Zhang, Yanchao; Liu, Wei; Fang, Yugang; "Secure Localization in Wireless Sensor Networks"; IEEE Military Communications Conference; Oct. 2005; pp. 3169-3175; vol. 5.

Non-final Office Action dated Jan. 22, 2009 in U.S. Appl. No. 11/320,318, filed Dec. 28, 2005 by Sean S. Lee et al.

Non-final Office Action dated May 19, 2008 in U.S. Appl. No. 11/319,673, filed Dec. 28, 2005 by Sean S. Lee et al.

Microsoft Computer Dictionary, Fourth Edition, 1999; pp. 403-404; definition of "server".

* cited by examiner

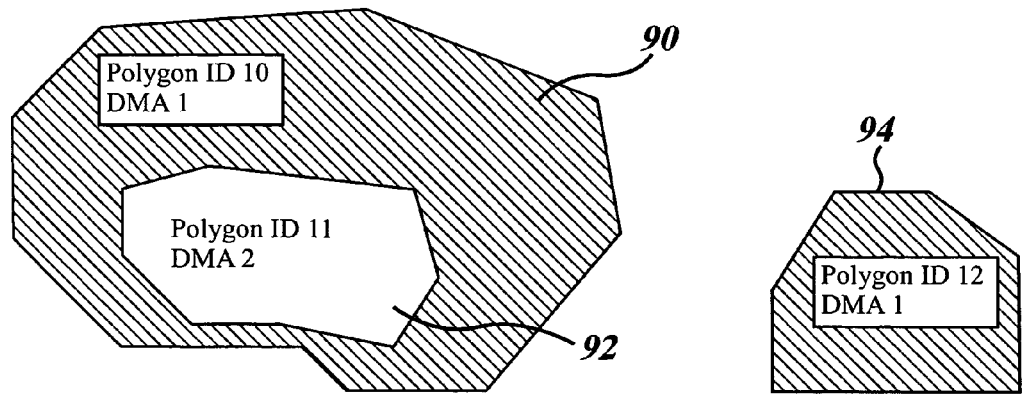
FIG. 4
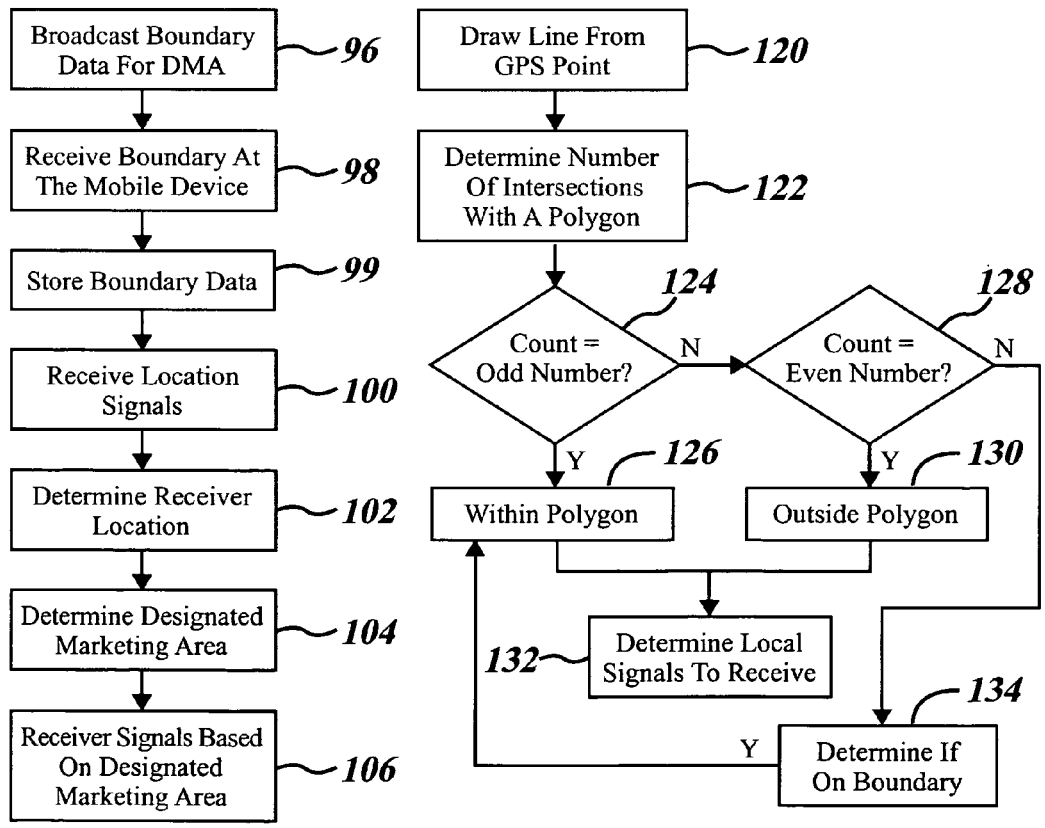
FIG. 5  FIG. 7

METHOD AND APPARATUS FOR PROVIDING EMERGENCY INFORMATION TO A MOBILE RECEIVING DEVICE

CROSS-REFERENCE TO RELATED APPLICATIONS

This application is a continuation-in-part of U.S. patent application Ser. No. 11/443,787, filed on May 31, 2006. This application claims the benefit of U.S. Provisional Application No. 60/754,480, filed on Dec. 28, 2005. The disclosures of the above applications are incorporated herein by reference.

TECHNICAL FIELD

The present invention relates generally to a mobile receiving device, and more specifically, to a method and apparatus for displaying emergency information from a mobile receiving device.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Federal regulations have specific boundaries enclosing specific areas for which satellite systems are allowed to display rebroadcast local channels. A satellite system located within one boundary may only display video for all channels associated with that region. Current satellite systems do not include a means for determining a location.

Television system operators can generate emergency messages to all users. Although the information may not be relevant for the entire broadcasting area, at least the emergency message is broadcast. Cable systems include a similar method broadcast for an entire system.

It would therefore be desirable to provide a system that allows emergency messages to be received and displayed in a mobile system that is specifically relevant to the user of the mobile receiving device.

SUMMARY

In one aspect of the invention, a method of operating a communication system includes broadcasting emergency information for a first area, broadcasting an emergency announcement indicator for the first area into the first area and a second area outside the first area, determining a location of a mobile receiving device, comparing the location of the first area and displaying emergency information when the location is within the first area.

In a further aspect of the invention, a communication system includes a satellite broadcasting data, an emergency broadcasting source broadcasting emergency information from a first area, a broadcast announcement source broadcasting an emergency announcement indicator for the first area into the first area and the second area outside the first area. The system further includes a display and a mobile receiving device coupled to the display and having a location receiver generating location information. The mobile receiving device compares the location in the first area and causes the emergency information to be displayed when the location is within the first area.

In a further aspect of the invention, a communication system includes a satellite broadcasting data, an emergency broadcasting source broadcasting emergency information from a first area, a broadcast announcement source broadcasting an emergency message that consists of a sequence of instructions that are to be evaluated by the mobile receiving device. The system includes a display and a mobile receiving device coupled to the display and having a location receiver generating location information. The mobile receiving device evaluates the emergency message and based upon the result of the evaluation can cause the emergency information to be displayed.

In another aspect of the invention, the normal broadcasting of data may be separated from the emergency broadcasting of data and the emergency broadcast indicator. This allows the system to be more flexible and emergency information may be localized.

A method may take into consideration a global positioning system or other device such as a cellular tower-based system, radio or TV tower for location determination.

Cellular, radio, TV or local wireless 802.11 type systems may be used as the source of either the emergency information or the emergency announcement message.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 4 is an example of various combinations of regions that can be described using polygons according to the present invention.

FIG. 5 is a flow chart illustrating one method for operating the present invention.

FIG. 7 is a flow chart illustrating a point inclusion detection algorithm.

DETAILED DESCRIPTION

Figure 1:
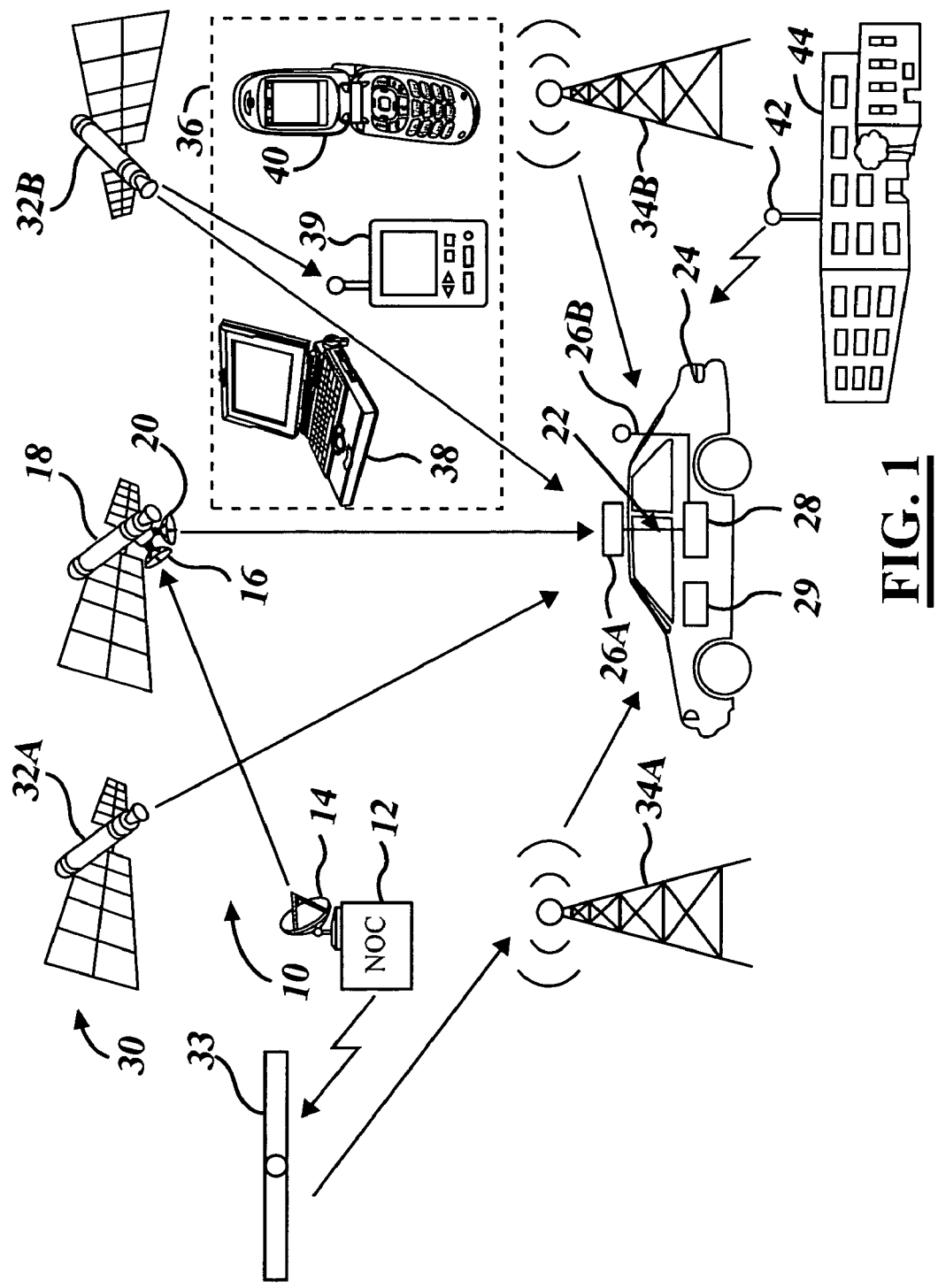
FIG. 1 is a system level view of a satellite broadcasting system according to the present invention.

In the following figures the same reference numerals will be used for the same views. The following figures are described with respect to a mobile satellite television system. However, those skilled in the art will recognize the teachings of the present invention may be applied to various types of mobile reception including land-based type systems.

Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a spaced-based system such as a satellite 18. The wireless signals, for example, may be digital. As will be described below, the wireless signals may be entertainment content, boundary data for areas of interest such as designated marketing areas and emergency message signals including an emergency announcement indicating emergency information and boundary areas associated therewith. Areas of interest may also include traffic, weather, hazardous material warning areas, advertising marketing area near a particular store or region or other types of areas. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A receiving antenna 26A receives the wireless signals from the satellite 18 and processes the signals in a mobile receiving unit 28. A second antenna 26B may also be included for receiving other types of signals including various RF signals. The second antenna 26B may be used to receive emergency message signals as will be described below. The mobile receiving unit 28 and its operation will be further described below.

The mobile receiving unit 28 may be various types of devices including but not limited to a cell phone, a wireless 802.11 device, a WiMax device or a car radio. The mobile receiving unit 28 may also interface with the vehicle audio system 29. For example, audible emergency messages may be broadcast over the vehicle speakers as well as in the mobile receiving unit. The driver, not the passengers, may be the relevant recipient of the emergency message signals.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include towers 34A and 34B that may be used by the mobile receiving system 22 to determine a location. The towers and the antennas associated therewith may be cellular phone, radio or TV tower. Cellular phones typically include a GPS locating system. As the vehicle 24 moves about, the exact coordinates in latitude and longitude may be used to determine the proper area of interest such as a designated marketing area which will control the mobile devices choices for local television and such broadcasted data. The towers 34A, 34B may also act as an RF source for transmitting emergency message signals and announcement indicators.

The system may also receive boundary information such as boundary points of designated marketing area polygons from the terrestrial-based system such as the towers 34A and 34B. In addition, the satellites may also be replaced with stratospheric platforms 33 for transmitting the area of interests and emergency message signals and indicators to the mobile device. Stratospheric platforms are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The present invention may also be used for displaying various wireless information including emergency information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from other types of broadcasting areas such as an antenna 42 on a building 44. The building 44 may be various types of buildings such as a store and the wireless information transmitted from the antenna 42 may be advertising information or emergency information. The wireless signals may include location or boundary information transmitted therewith. As will be described below, the information may be coded digitally into the signals. Thus, by reviewing the location information, signals appropriate for the location of the mobile devices may be displayed on the various devices. This will be further described below.

Various devices in FIG. 1 may be considered an emergency broadcast source and an emergency announcement source. That is, the satellite 18, stratospheric platform 33, the towers 34 or the antenna 42 may act as either source.

Figure 2:
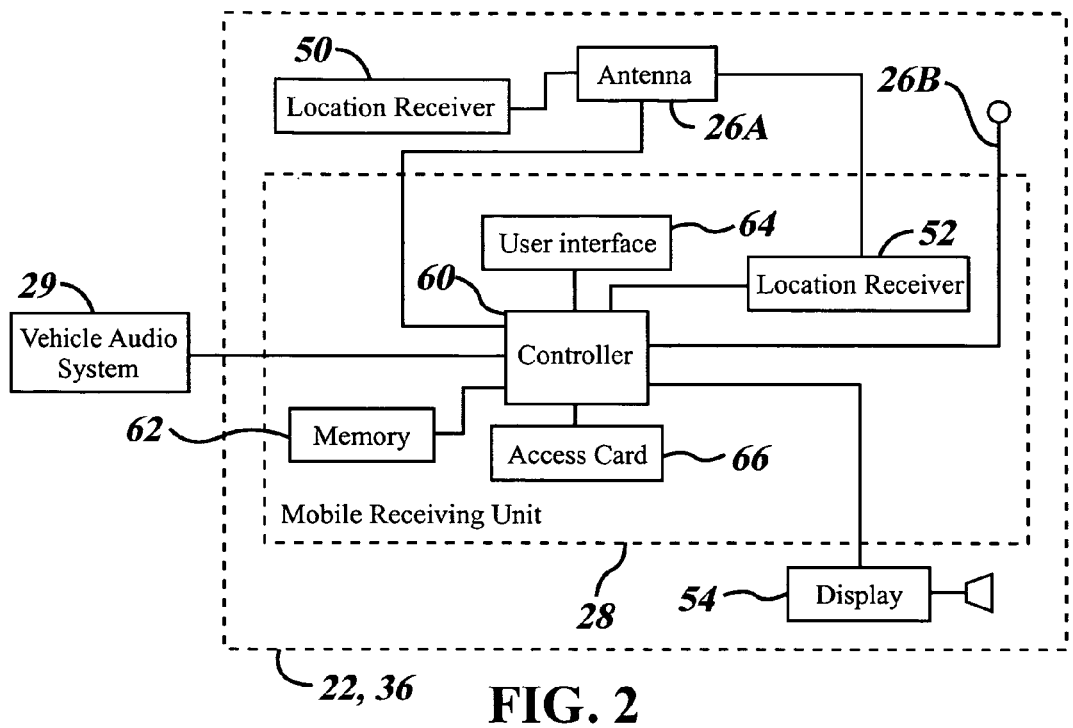
FIG. 2 is a block diagrammatic view of a vehicle having a receiving system according to the present invention.

Referring now to FIG. 2, a receiving unit 22 is illustrated in further detail. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 50 such as GPS receiver. The antenna 26 may also be an electronic antenna.

The mobile receiving unit 28 is coupled to antenna 26. The mobile receiving unit 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to GPS receiver 52 and/or GPS receiver 50. The mobile receiving unit 28 includes a display 54. The display 54 may be incorporated into the device 36 or within the vehicle 24.

A controller 60 that is microprocessor-based may be used to control the various functions of the receiving unit 28. The controller 28 may also be coupled to the vehicle audio system 29 so that emergency information may be displayed audibly or visually thereby. Such functions include acting as a tuner, receiver, decoder, buffer and other functions. The controller may be similar to that found in current DirecTV set top boxes which employ a chip-based multifunctional controller. The controller 60 may include or be coupled to a memory 62. Memory 62 may be used to store the boundaries of various areas of interest received from the antenna as broadcast by one of the devices 32, 33 or 34 described above. An area of interest is a fixed geographic or cartographic area bounded by a closed shape such as a polygon, circle, curved or straight line segments, or the like. The fixed area or closed shape has outer boundaries that do not move on the surface of the earth. As will be shown below, areas may be excluded (island-like) within a closed shape. Although the areas are fixed, they may be, from time to time, redetermined and rebroadcast to the mobile device for usage. A key feature is that as the vehicle or mobile device moves, the area of interest remains fixed on the surface of the earth and thus the device may enter into another area of interest. Boundaries of certain areas of interest such as a designated marketing area (DMA) may be defined by Nielsen and may be pre-programmed into the memory 62 as a number of polygons wherein each point of each side is defined in cartographic coordinates of longitude and latitude and fractions of degrees. As will be described below the polygons may be formed of corners whose latitude and longitude are stored within the memory.

The location receiver 52 is capable of providing latitude and longitude to the controller 60. The controller 60 may be used to compare the location signals from the location receiver 50, 52 to the boundaries of the areas of interest such that the mobile device can determine which areas of interest it is within and which areas of interest it is not within. From this determination it can control IRD behavior such as allowing or disallowing display of certain audio or video channels. One application is to broadcast areas of interest that represent designated marketing areas to determine which designated marketing area the mobile device is within and which area it is not within, which signals the system should be receiving. These signals may coincide with or coordinate to the local broadcasting signals for the specific designated marketing area. It should be noted that more than one designated marketing area may be provided for a particular area. That is, adjacent areas may also be authorized for viewing. Various fringe regions may be used around a particular designated marketing area to provide hysteresis for the system. This function will be further described below.

The controller 60 may also be coupled to a user interface 64. User interface 64 may be various types of user interfaces such as a keyboard, push buttons, a touch screen, a voice activated interface, or the like. User interface 64 may be used to select a channel, select various information, change the volume, change the display appearance, or other functions. The user interface 64 is illustrated as part of the mobile receiving unit. However, should the unit be incorporated into a vehicle, the user interface 64 may be located external to the mobile receiving unit such as dial buttons, voice activated system, or the like incorporated into the vehicle and interface with the mobile receiving unit.

An access card 66 may also be incorporated into the mobile receiving unit. Access cards such as conditional access module (CAM) cards are typically found in DirecTV units. The access card 66 may provide conditional access to various channels and wireless signals generated by the system. Not having an access card or not having an up-to-date access card 66 may prevent the user from receiving or displaying various wireless content from the system.

Figure 3:
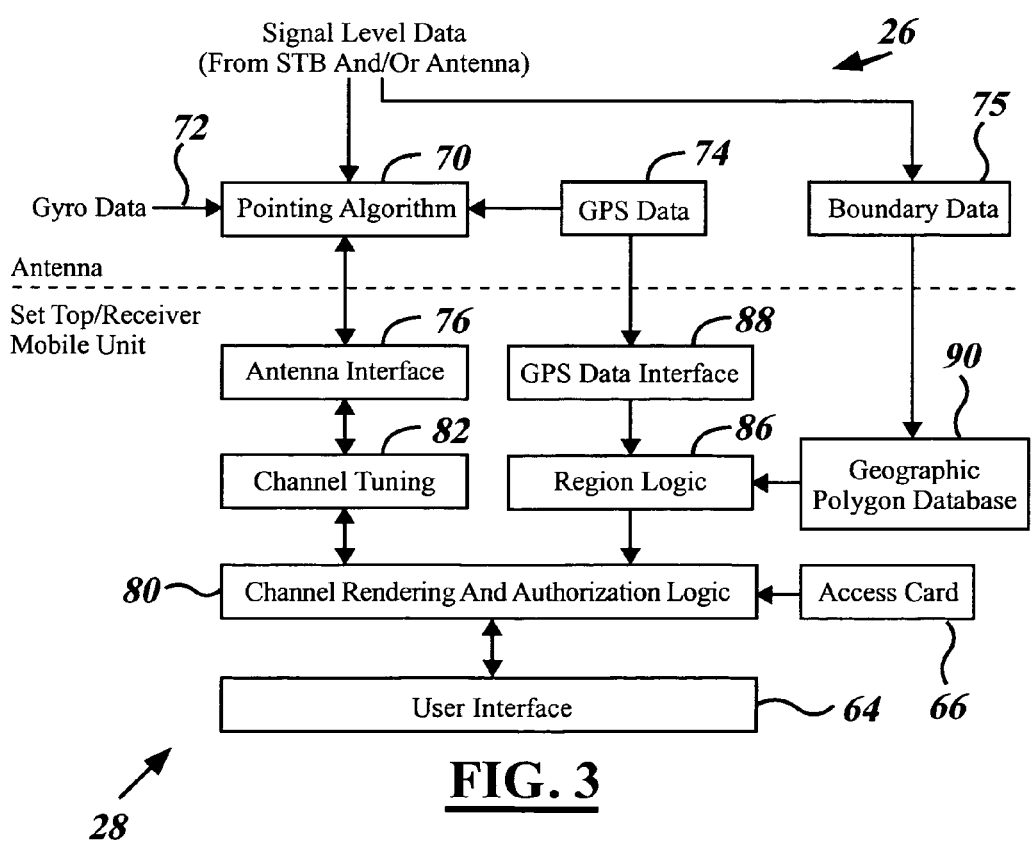
FIG. 3 is a block diagrammatic view of the various logic of the antenna and the set top mobile receiving unit.

Referring now to FIG. 3, a block diagrammatic view of the mobile receiving unit 28 and the antenna 26 is illustrated. The boxes here represent the software logic that may be used to implement the invention. Various information may be associated with the antenna 26. The antenna 26 may include a pointing algorithm 70 therein. The pointing algorithm 70 may receive information from gyros in the antenna and be provided as gyro data 72. GPS data 74 may be provided from the GPS or location receiver 50, 52 illustrated above in FIG. 2. Other information may be provided from the mobile receiving unit such as channel tuning information and the like.

The antenna may also be used to receive boundary data 75 from the various sources described above. The boundary data 75 may be received from a satellite, a terrestrial-based system, or a stratospheric platform. The boundary data 75 is stored within the memory 90. The boundary data may include many forms including equations for line segments, corners of intersections of line segments in latitude and longitude, or other information defining the boundaries of the area of interests.

The mobile receiving unit 28 may include an antenna interface 76 that is used to communicate with the antennas 26A and 26B above. The antenna interface 76 formats the signals from the mobile receiving unit. For example, various signal level data such as the channel tuning information may be provided. Data from the user interface 64 and the conditional access card 66 may be used by the channel rendering and authentication logic 80. The channel rendering and authentication logic 80 may authorize the particular user based upon the conditional access card. Information entered from the user interface such as a password may also be used in the authentication logic. Various methods for authentication are well known in the art. The channel rendering portion of the channel rendering and authentication logic 80 receives information from the user interface 64 as to which wireless signals the user would like to receive. In the care of emergency signals, the signals may communicate tuning information that will signal the rendering logic 80 to automatically override the user's choice and time to the emergency information. This will be described below. The channel rendering and authentication logic 80 generates signals that are provided to the channel tuning logic 82. The channel tuning logic 82 provides channel tuning information based upon the channel rendering information. The channel tuning logic 82 may include a receiver and a decoder used for receiving and decoding the appropriate channels including emergency channels. The channel tuning logic may provide information to the antenna interface 76 such as the direction of the signal or satellite that contains the particular channel that is desired. This information may be used by the pointing algorithm 70 to rotate the antenna in the appropriate direction.

The controller may also include receiving logic 86. The receiving logic 86 may provide information to the channel rendering logic as to the particular region that the antenna or the mobile receiving unit is located. The region logic 86 may be coupled to the GPS data interface 88. The GPS data interface 88 provides GPS information to the region logic so that appropriate signals may be received or displayed.

One use of the receiving logic 86 is that based upon the GPS signals, the location of the receiving unit may be selected. The receiving logic 86 may then look up in a geographic polygon or location database 90 which designated marketing area or emergency area the receiving device is located. From this information the appropriate geographically specific data such as local broadcast television channels or emergency information may be selected. The database 90 may consist of polygon boundary information used to define the marketing areas. The database 90 may also include other information such as zip code information or other ranges of data used for comparison with the signals. As will be evident to those skilled in the art, the wireless signals may be received with various location data used to identify the location appropriate for the signal to be displayed in. For example, the data may include information such as that the particular signal may be a local broadcast from the Washington, D.C. area, whereas other signals may indicate local broadcasting from the Baltimore area. When the vehicle is in the proper location, the proper signal may be displayed on the mobile device.

The location information may be provided in various portions of the signal. If the signal is an all digital signal the location information may be provided in a preamble of the information packet. If the signal is an analog signal the location data may be included in a vertical blanking interval of an analog television signal or as unused bandwidth of a digital television signal. In a purely analog signal, the location data may be superimposed digitally on the analog signal.

Referring now to FIG. 4, an example of a complex fixed area of interest on the surface of the earth is shown. Although a area of interest is used in this example, the same applies to emergency area boundaries. A polygon having ID 10 and an assigned market area value of 1 is shown as area 90. Area 92 corresponds to a polygon ID of 11 and an assigned market ID value of 2. Polygon 94 is also of market area 1 and has a polygon ID of 12. It should be noted that each of the polygons are closed polygons. It should also be noted that there is no overlap between Area 92 and Area 90 such that Area 92 is an island inside Area 90. Area 90 taken by itself contains a hole the shape of Area 92. One method for determining boundaries of a polygon as a set of longitude and latitude points is set forth as:

```
typedef struct {
    polygon id
    number of polygon points
    for (i = 0; i < number of market areas in object; i++) {
        latitude degrees value
        latitude 1/1000 minutes value
        longitude degrees value
        longitude 1/1000 minutes value
} POLYGON_T;
```

The unique polygon ID may be used in a data structure such that the area of interest can be a set of unjoined polygons as well as excluded regions as set forth in:

```
typedef struct {
    DMA id
    length of DMA
    number of included regions
    for (i = 0; 1 < number of included regions; i++) {
        polygon Id
    }
    number of excluded regions
    for i = 0; i< number of excluded regions; i ++) {
        polygon id
} DMA T:
```

A representation of the designated marketing area 1 may be illustrated in code as:

| | |
|---|---|
| DMA id | 1 |
| number of included regions | 2 |
| polygon id | 10 |
| polygon id | 12 |
| number of excluded regions | 1 |
| polygon id | 11 |

Referring now to FIG. 5, a method for operating a television broadcasting system is illustrated. Similar logic applies to emergency areas. In step 96 the boundary data for the area of interest is broadcast by one of the types of devices described above such as a satellite, a terrestrial-based antenna, a cellular tower, or stratospheric platform. In step 98 the boundary information is received at the mobile device. In step 99 the boundary data is stored in the memory of the mobile device.

In step 100, the system or mobile device receives location signals. The receiver location is determined from the location signals in step 102. As mentioned above, the location signals may use GPS satellites or cellular telephone systems for determining the exact longitude and latitude down to an acceptable limit to determine the location of the mobile receiving device.

In step 104, the area of interest for the receiver location is determined. As mentioned above, various polygons or the like may be stored in the memory of the receiving device so that the particular area of interest at that moment in time for the position of the mobile receiving device may be determined. A lookup table for coordinates may be set forth or polygonal areas may be set forth to determine in which area of interest the mobile receiving device is located. If the system is not used for television signals, this step may be optional. Determining inclusion within a area of interest is set forth in FIG. 7.

In step 106, the controller of the system selects the particular local channel based upon the determination of the area of interest in step 84. Of course, some hysteresis may be accounted for in this method.

Referring now to FIGS. 6A-6D, various irregular shaped closed polygons are illustrated. The mobile device is located at the respective point 110A-110D in each of the various figures, respectively. The polygonal shapes 112A-112E are shown as irregular shapes. When the system is operated, it is not known whether the mobile device is located within or outside of the boundaries. One method for determining this is using a point inclusion detection algorithm. A line is arbitrarily drawn in a direction from the mobile device or point 110 in each of the figures. This is performed using a raycasting technique. In the raycasting the number of intersections with a line is determined. Although in FIG. 6 horizontal lines are shown, various other directions may be drawn.

Figure 6A:
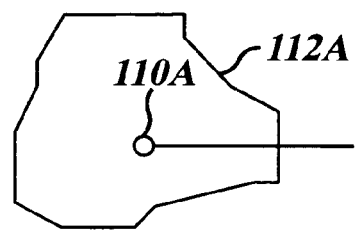
FIGS. 6A-6E are a top view of various polygons for use in a point inclusion detection algorithm.

In FIG. 6A, the number of intersections between the point 110A and the polygon is one. Therefore, any odd numbered amounts correspond to the mobile device being within the polygon.

Figure 6B:
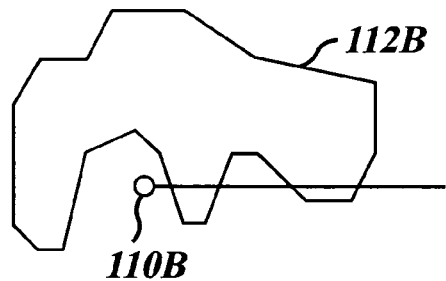

Referring now to FIG. 6B, four intersections of the line from point 90B is illustrated. Thus, a count of the number of intersections is four and thus the point is outside the polygon.

Figure 6C:
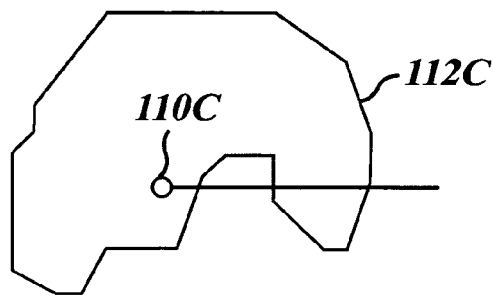

In FIG. 6C, three intersection points are counted. Therefore, the point 90C is within the area of interest.

Figure 6D:
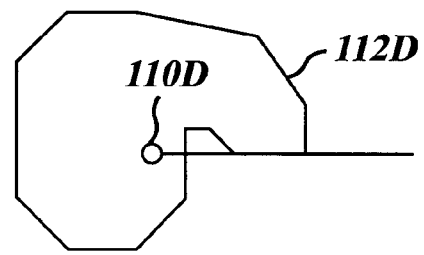

In FIG. 6D, the points of the polygon are on the GPS points line. In this case, all the polygon points should be ignored as intersections and only when the polygon's points have crossed the GPS line should an intersection be counted. In this case, there is just one intersection and the GPS point is therefore inside the polygon because of the odd number.

In summary, an odd number of intersections indicates that a point is within a polygon. An even number of intersections indicates the GPS point is outside the polygon.

Figure 6E:
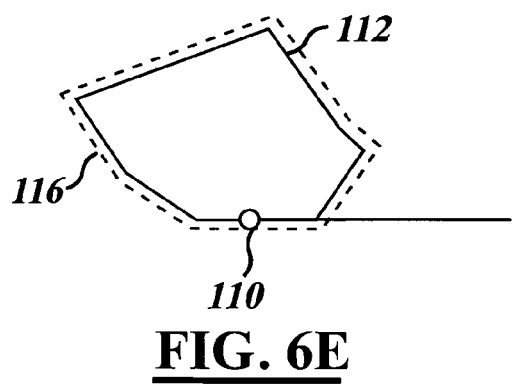

Referring now to FIG. 6E, the GPS point 110E is on the boundary of the polygon. In this case the GPS point will be defined as being inside the polygon. Because the boundary of one polygon is likely to be the boundary of an adjacent polygon, the GPS point 110E may be a member of multiple regions when it lies on the boundary lines between the areas of interest. This may be confusing for a system. Therefore, if the mobile device is within the polygon and is moving toward the boundary, hysteresis buffer zone 116 may be provided around the polygon so that not until the vehicle or mobile device leaves the buffer zone 116 would the behavior of the mobile device change.

Referring now to FIG. 7, a method for performing a point inclusion detection algorithm is illustrated. In step 120, a line is drawn from a GPS point. In step 122, the number of intersections of the line with the closed polygon is determined. In step 124, if an odd number is counted in step 124, step 126 determines that the system is within the polygon and within the area of interest.

Referring back to step 124, if the count is not odd step 128 is executed. In step 124, if the count is even, the system is outside the polygon in step 130. If the count is not even or odd in step 128, step 132 is executed in which it is determined whether or not the system is on a boundary. A boundary system is illustrated in FIG. 5E above. If the system is on a boundary, the system determines whether it is within a polygon in step 134. After both steps 126 and 130 are executed, the controller of the system determines the local signal to receive based upon the area of interest. These channels are displayed on the display of the receiving device.

Figure 8:
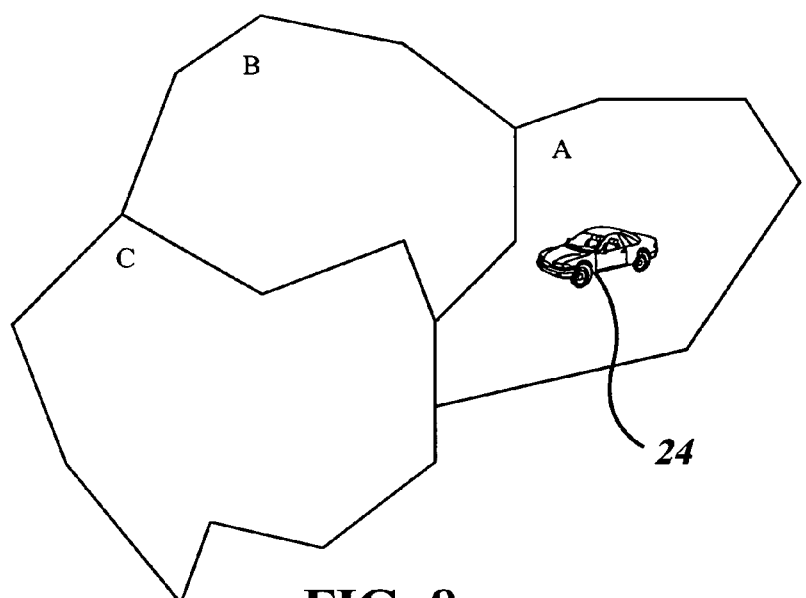
FIG. 8 is a top view of three adjacent polygonal direct marketing areas.

Referring now to FIG. 8, a plurality of areas of interest such as designated marketing area polygons or emergency information polygons are illustrated as A, B, and C. At some segment each of the polygons are adjacent to each other. The points representing each polygon may follow any arbitrary rule such as political boundaries, geographic boundaries, or any areas of interest. Various types of information may be transmitted to the mobile device such as vehicle 24 to convey the boundaries. In one implementation, the mobile device may receive corner points in latitude and longitude. Based upon the boundaries of the polygon, the device may determine in which polygons it is inside and which it is outside. Various actions may be performed by the mobile device as a result of determining which polygon it is in based upon coded actions or instructions that use the broadcasted polygon. It should be noted that emergency information polygons may not be the same or coincide with area of interests.

Figure 9:
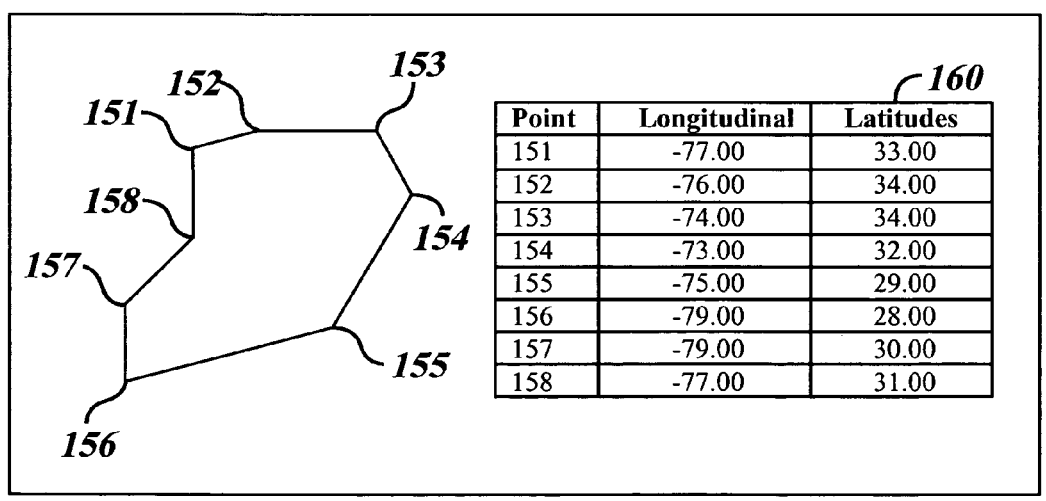
FIG. 9 is a top view of polygonal region A of FIG. 8 with a table identifying the corner points.

Referring now to FIG. 9, polygon A of FIG. 8 is illustrated in further detail. Each of the corner points represents an intersection of two line segments of the polygon. In this example, points 151 through 158 represent corners of the polygon. Table 160 includes the point, the longitude and the latitude of each of the corner points. Thus, the points representing the polygon may be transmitted in a data structure that will be received by the receiving device as an object used for comparison with the GPS location. One example of a C-style structure of an object is set forth below.

```
struct geographic_polygon {
    int         unique_id;
    int         version;
    int         number_of_points;
    for (i = 0; i < number_of_points; i++) {
        int         longitude_degrees;
        int         longitude_minutes;
        int         longitude_seconds;
        int         latitude_degrees;
        int         latitude_minutes;
        int         latitude_seconds;
    }
}
```

Thus, each geographic polygon may be transmitted as a unique object that may be referenced individually. In this manner, a series of geographic polygons can be transmitted to a mobile device and stored in a memory such as dynamic random access memory or a non-volatile memory such as flash memory. This memory may then be periodically referenced as the mobile device's GPS coordinates change. By comparing the GPS coordinates with the polygonal boundaries, the receiving device may determine which polygon it is in and which polygon it is outside of. Various actions may be taken in response to the particular polygon, such as the types of displays or assorted messages may be displayed to the user, various audio clips may be played, allowing or blocking various channels to be displayed on the display device, or tuning to a particular broadcast channel may be performed in response to the comparison to the polygonal boundaries and the GPS coordinates.

Examples of a use of broadcasted polygons are for providing area of interests for local channel display or blockage and for emergency message signals. The satellite or other device may broadcast a geographic polygon for each area of interest because the area of interest has a unique ID and version, updates to a particular polygon representing a area of interest may be dynamically performed in the future. The mobile receiver then evaluates its location in reference to which polygon it is in and as a result, various expressions may be activated or deactivated. This may take the form of activating or deactivating various local channels.

Another example of the use of the present invention is in emergency weather situations where all mobile receiving devices in a geographic area may be notified of an impending severe weather situation. This may also be used for non-weather situations such as in conveying disaster information. In this manner, a complex polygon may be broadcast and vehicles within the polygon may receive the message detailing the specific weather or other type of alert.

Figure 10:
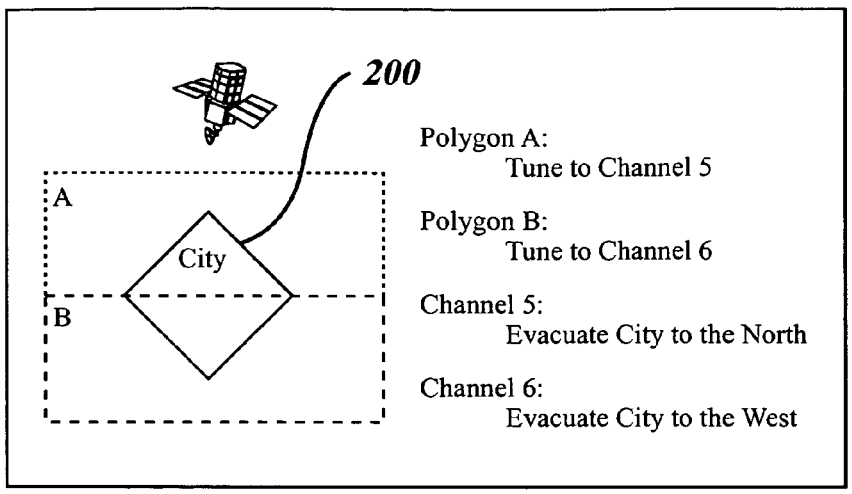
FIG. 10 is a topographic view of a portion of the earth having two areas of interest and a receiving device therein.

Referring now to FIG. 10, a first polygon A and a second polygon B are shown relative to a city that has border lines 200. As is shown, the border line 200 encloses a portion in polygon A and polygon B. As mentioned above, the polygons do not necessarily correspond to a area of interest. The polygon area may correspond to other boundaries corresponding to a particular emergency. Tuning information may be provided for polygon A such as "tune to channel 5" and tuning information for polygon B "tune to channel 6" may be provided by the system. When the mobile receiving device is tuned channel 5 or 6, the instructions may state something like "Evacuate the city to the North" or "Evacuate the city to the West". This would be particularly useful when a situation such as a hurricane or the like is approaching. Such a system allows for traffic instructions to be provided to minimize congestion on the highways.

Figure 11:
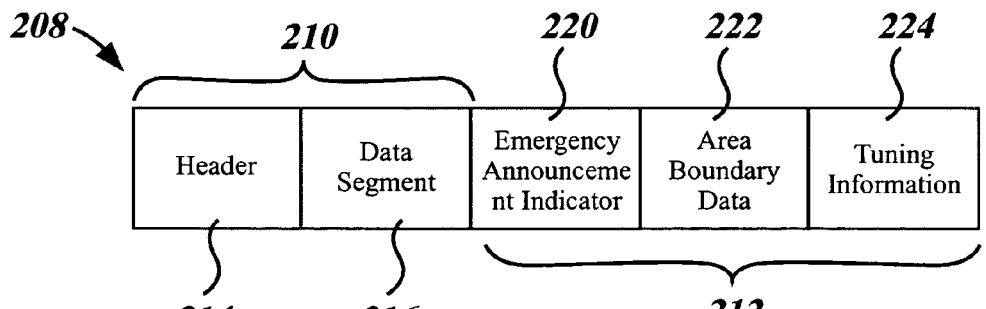
FIG. 11 is a plot of a communication signal having a normal portion and an emergency portion.

Referring now to FIG. 11, a data signal 208 is illustrated for the system. In this example, a normal segment 210 and an emergency segment 212 is provided. In this example, the emergency segment 212 is in addition to the normally broadcast information 210. The normally broadcast information 210 may include a header 214 and a data segment 216. The header may include various identifying information for the data segment 216. The data segment may be various types of data including audio signals, video signal, or data. The emergency segment may include an emergency announcement indicator 220, area boundary data 222, and tuning information 224. As will be described further below, the emergency segment 212 is transmitted directly after the segment 210. In this example, the structure illustrated for the communication signal 208 is suitable for satellite broadcasting. However, as mentioned below, the emergency portion or portions of the emergency portion 212 may be provided by a separate broadcasting source, for example, the satellite television system. The normal broadcast portion 210 is broadcast by the satellite while the segment 212 is broadcast by a terrestrial source or stratospheric platform. The data signal may be formed at the network operation center or a central facility after receiving the information from an emergency information provider.

The emergency announcement indicator is a general indicator to the receiving device that an emergency announcement is available. The area boundary data 222 defines the area for which the emergency announcement is applicable. In segment 224, tuning information that may direct a receiving device or user to another channel in which the tuning information may be displayed. The tuning information may be used to automatically tune the receiving or provide an overlay on display as will be described below. Coded information recognizable by the receiver may be used for automatic tuning.

Figure 12:
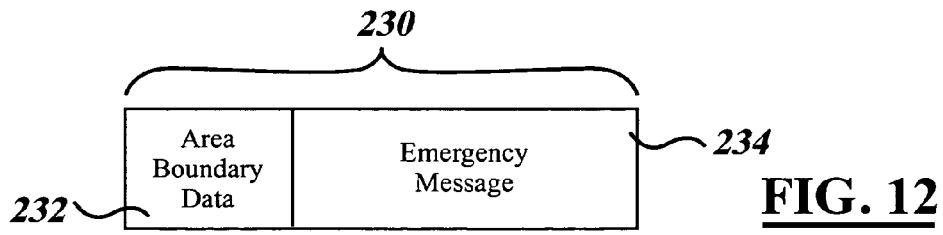
FIG. 12 is a plot of an emergency broadcast signal.

Referring now to FIG. 12, emergency information 230 is illustrated. Emergency information may include an area boundary data portion 232 and an emergency message portion 234. The area boundary data corresponds to the area in which the emergency data is relevant. The emergency message may comprise various types of messages, including evacuation routes, locations of various events, or the like. The system may also provide a broadcast announcement source broadcasting an emergency message that consists of a sequence of instructions that are to be evaluated by the mobile receiving device. The mobile receiving device may evaluate the emergency message and based upon the various conditions. One example includes:

```
message =
    if ("device is satellite receiver") {
        if ("device is north of DC?") {
            tune to satellite channel 1002 - evacuate north I-95.
        }
        else {
            tune to satellite channel 1001 - evacuate south I-95.
        }
    }
    else if ("device is radio receiver") {
        if ("device is north of DC?") {
            tune to radio channel 88.1 - evacuate north I-95.
        }
        else {
            tune to radio channel 88.3 - evacuate south I-95.
        }
    }
    else {
        if ("device is north of DC?") {
            display text- evacuate north I-95.
        }
        else {
            display text- evacuate south I-95.
        }
    }
```

Figure 13A:
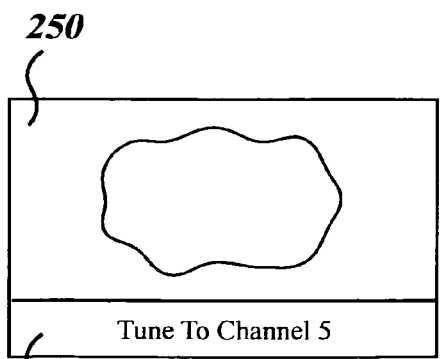
FIGS. 13A and 13B are examples of a display indicating emergency or tuning information.
Figure 13B:
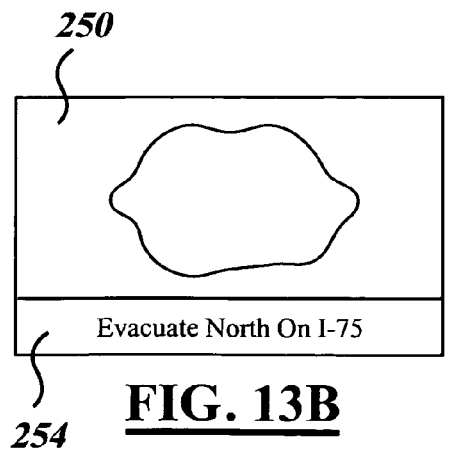

Referring now to FIG. 13A, a display 250 includes a footer 252 which includes tuning information broadcast thereto from one of the various sources. In FIG. 13B, a footer 254 includes the emergency message "Evacuate North on I-75" therein. Thus, either the tuning information such as that shown in FIG. 13A or an emergency message 234 may be provided to the users. In both examples of FIGS. 13A and 13B, footers are illustrated. However, the emergency message or tuning information may be provided in a header, side bands or across the whole display screen. In addition, the display may include an audible display heard through the speakers associated with the receiving device. It should also be noted that the visual display or audible display may include a redundant display within the vehicle. That is, in addition to the display for the receiving device, a heads-up, navigation system, or instrument panel display may be used to display the warning information. Also, the vehicle sound system may be used to generate the audible display.

Figure 14:
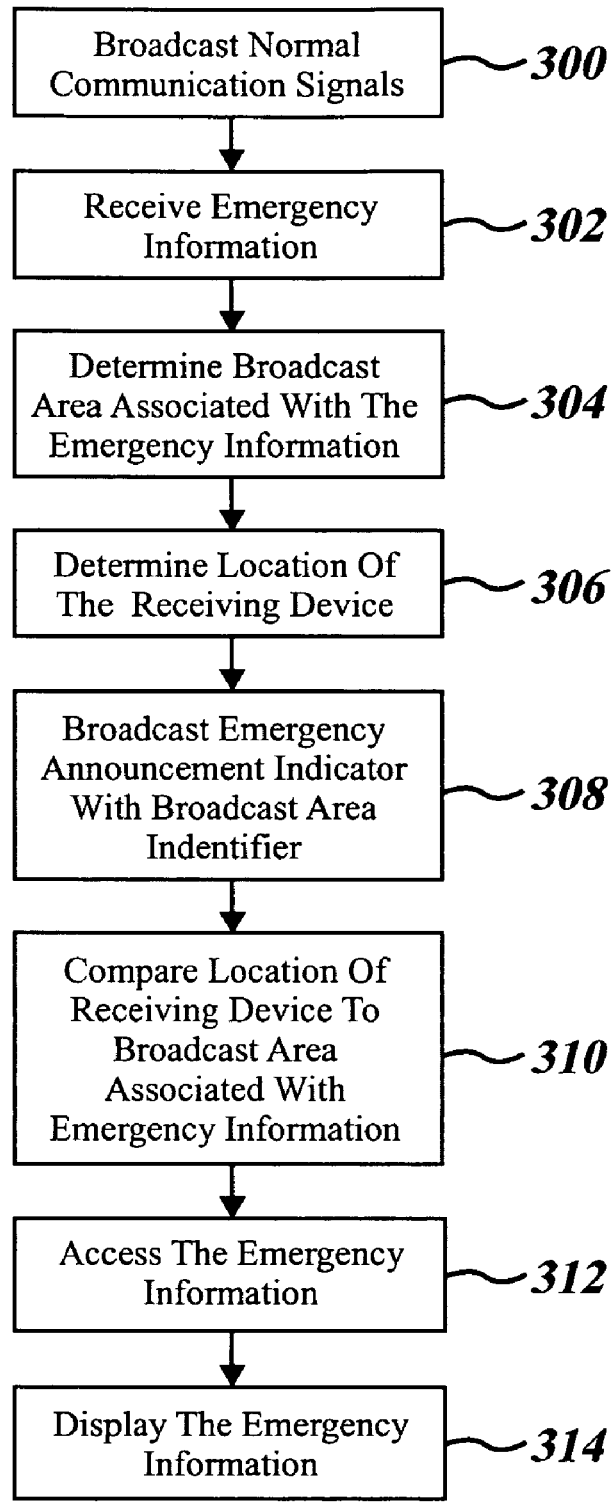
FIG. 14 is a plot of a flowchart for operating the communication system for conveying emergency information to a mobile receiving device.

Referring now to FIG. 14, a method of operating the communication system according to the present invention is illustrated.

In step 300, normal communication signals are broadcast. As mentioned above, these signals may, for example, be satellite television signals. In step 302, emergency information is received. The emergency information may be received at a head end or network operation center 12 illustrated in FIG. 1. Of course, an RF source such as the cellular communication system, TV or a radio source may also receive the emergency information. In step 304, the broadcast area associated with the emergency information is determined. The particular emergency information may only have applicability to a specific geographic region. These regions may or may not correspond to area of interests. In step 306, the location of the receiving device is determined. In step 308, an emergency announcement indicator is broadcast with a broadcast area identifier. The emergency announcement indicator may broadcast together with a satellite signal or may be broadcast separately from various devices including an RF source, a stratospheric platform, or the like. The broadcast identifier identifies the particular area for which the emergency information is relevant. The information may be broadcast securely using asymmetric encryption or the like.

In step 310, the location of the receiving device is compared to the broadcast area associated with the emergency information. In step 312, the emergency information is accessed by the device. As mentioned above, the device may include a mobile phone, personal electronic device, a satellite television receiver, an automobile-based satellite television receiver or the like. Accessing the emergency information may also include automatically tuning the receiving device to a particular channel. The particular channel may be outside of the format for which the emergency announcement indicator is broadcast. For example, in a satellite system, the emergency announcement indicator may be broadcast within the satellite communication beams. However, the emergency information may be broadcast by a local terrestrial source. The information that is broadcast by the emergency broadcasting source may include tuning information (particular codes or the like) that automatically tunes the device to a particular channel on another system. This may require an additional antenna such as the antenna 26B illustrated in FIG. 1.

In step 314, the emergency information is displayed. This may be audibly displayed such as over a speaker system associated with the receiving device or generating an audible signal over a vehicle audio system. Displaying may also include visually displaying the information on portions of a screen including a video screen associated with the receiving device or another screen within an automotive vehicle such as instrument cluster screen, navigation system screen, or the like.

As can be appreciated by the above examples, the emergency information may be broadcast by a different broadcasting source than the overall source of the communication signals regularly received by the device. In a satellite broadcasting system, the emergency information may be broadcast terrestrially while the normal signals are generated from a satellite-based system. Emergency announcement indicators are provided to the system and generated with the normally broadcasted signals. In other examples, the emergency announcement indicators may be broadcast separately from a separate source. Thus, as can be appreciated, various combinations of emergency broadcasting information and emergency announcement information may be provided.

While the above example has been set forth with respect to a single signal, it should be noted that multiple satellite signals may be used in a similar manner. That is, because there are many users within a vehicle, each user may have the capability of selecting various channels.

What is claimed is:

1. A method of operating a communication system comprising:
   broadcasting emergency information for a first area;
   broadcasting an emergency announcement indicator for the first area into the first area and a second area outside the first area;
   receiving the emergency information and the emergency announcement indicator at a mobile receiving device;
   determining a location of the mobile receiving device;
   comparing the location and the emergency announcement indicator; and
   displaying emergency information at the mobile receiving device when the location is within the first area determined in response to comparing.

2. A method as recited in claim 1 wherein displaying comprises displaying audio information.

3. A method as recited in claim 1 wherein displaying comprises displaying video information.

4. A method as recited in claim 1 further comprising broadcasting tuning information.

5. A method as recited in claim 4 wherein broadcasting tuning information and broadcasting the emergency announcement are at a common source with a common transmission method.

6. A method as recited in claim 4 wherein broadcasting tuning information comprises broadcasting tuning information from a satellite.

7. A method as recited in claim 4 wherein broadcasting tuning information comprises broadcasting tuning information from a terrestrial antenna.

8. A method as recited in claim 4 wherein broadcasting tuning information comprises broadcasting tuning information from a terrestrial RF source.

9. A method as recited in claim 8 wherein the RF source comprises a terrestrial radio source.

10. A method as recited in claim 4 wherein broadcasting tuning information comprises broadcasting tuning information from a wireless network.

11. A method as recited in claim 4 wherein broadcasting tuning information comprises broadcasting tuning information from a cellular network.

12. A method as recited in claim 4 further comprising automatically controlling the mobile receiving device in response to the tuning information.

13. A method as recited in claim 12 wherein automatically controlling comprises tuning to an emergency channel broadcasting the emergency information.

14. A method as recited in claim 1 wherein broadcasting emergency information comprises broadcasting traffic information, weather information or hazardous material information.

15. A method as recited in claim 1 wherein broadcasting emergency information comprises broadcasting emergency information from an emergency information source separate from an emergency announcement indicator source.

16. A method as recited in claim 1 wherein broadcasting an emergency announcement indicator comprises satellite broadcasting the emergency announcement indicator.

17. A method as recited in claim 1 wherein the mobile receiving device comprises a mobile phone.

18. A method as recited in claim 1 wherein the mobile receiving device comprises a personal electronic device.

19. A method as recited in claim 1 wherein receiving comprises receiving from a satellite.

20. A method as recited in claim 1 wherein broadcasting emergency information comprises broadcasting emergency information from a terrestrial source.

21. A method as recited in claim 1 wherein broadcasting emergency information comprises broadcasting emergency information from a satellite.

22. A method as recited in claim 1 wherein broadcasting emergency information comprises broadcasting emergency information from a stratospheric platform.

23. A method of operating a mobile receiving device comprising:
   receiving a broadcast signal at the mobile receiving device;
   receiving an emergency announcement indicator and tuning information for a first area at the mobile receiving device;
   determining a location of the mobile receiving device;
   comparing the location and the emergency announcement indicator;
   tuning the mobile receiving device to receive emergency information corresponding to the tuning information in response to comparing; and
   displaying the emergency information at the mobile receiving device.

24. A method as recited in claim 23 wherein displaying comprises displaying audio information.

25. A method as recited in claim 23 wherein displaying comprises displaying video information.

26. A method as recited in claim 23 wherein tuning the receiver comprises automatically tuning the receiver.

27. A method as recited in claim 23 wherein displaying comprises audibly displaying.

28. A method as recited in claim 23 wherein displaying comprises visually displaying.

29. A communication system comprising:
   an emergency broadcasting source broadcasting emergency information for a first area;
   a broadcast announcement source broadcasting an emergency announcement indicator for the first area into the first area and a second area outside the first area;
   a display; and
   a mobile receiving device coupled to the display and having a location receiver generating location information, and controlling a display in response to the data, comparing the location and the emergency announcement indicator and causing the emergency information to be displayed when the location corresponds to the emergency announcement indicator.

30. A communication system as recited in claim 29 wherein the emergency broadcast source is the same as the emergency announcement source.

31. A communication system as recited in claim 29 wherein the emergency broadcast source is different than the emergency announcement source.

* * * * *